(12) United States Patent
Gilboa (10) Patent No.: US 6,188,355 B1
(45) Date of Patent: Feb. 13, 2001

(54) WIRELESS SIX-DEGREE-OF-FREEDOM LOCATOR

(75) Inventor: Pinhas Gilboa, Haifa (IL)

(73) Assignee: Super Dimension Ltd., Herzelia (IL)

(*) Notice: Under 35 U.S.C. 154(b), the term of this patent shall be extended for 0 days.

(21) Appl. No.: 09/210,541

(22) Filed: Dec. 14, 1998

(30) Foreign Application Priority Data

Dec. 12, 1997 (IL) ........................................................ 122578

(51) Int. Cl.[7] .............................. H04B 7/185; G01S 5/02
(52) U.S. Cl. ........................................ 342/448; 324/207.17
(58) Field of Search ........................ 342/448; 324/207.17, 324/207.22, 244, 245

(56) References Cited

U.S. PATENT DOCUMENTS

| | | |
|---|---|---|
| 3,121,228 | 2/1964 | Kalmus . |
| 3,868,565 | 2/1975 | Kuipers . |
| 3,983,474 | 9/1976 | Kuipers . |
| 4,017,858 | 4/1977 | Kuipers . |
| 4,054,881 | 10/1977 | Raab . |
| 4,287,809 | 9/1981 | Egli et al. . |
| 4,314,251 | 2/1982 | Raab . |
| 4,394,831 | 7/1983 | Egli et al. . |
| 4,396,885 | 8/1983 | Constant . |
| 4,737,794 | 4/1988 | Jones . |
| 4,742,356 | 5/1988 | Kuipers . |
| 4,829,250 | 5/1989 | Rotier . |
| 4,849,692 | 7/1989 | Blood . |
| 5,070,462 * | 12/1991 | Chau ..................................... 342/448 |
| 5,099,845 * | 3/1992 | Besz et al. ........................ 128/653.1 |
| 5,307,072 | 4/1994 | Jones, Jr. . |
| 5,347,289 | 9/1994 | Elhardt . |
| 5,600,330 | 2/1997 | Blood . |
| 5,646,524 | 7/1997 | Gilboa . |
| 5,646,525 | 7/1997 | Gilboa . |
| 5,729,129 * | 3/1998 | Acker .............................. 324/207.12 |

FOREIGN PATENT DOCUMENTS 2197078   10/1987   (GB) .

* cited by examiner

Primary Examiner—Theodore M. Blum
(74) Attorney, Agent, or Firm—Mark M. Friedman (57) ABSTRACT

A method for determining the position and orientation of an object with respect to a reference frame, made up of providing the object with three independent transmitters of electromagnetic radiation, providing three independent receivers of the electromagnetic radiation, each of the receivers having a fixed position in the reference frame, transmitting the electromagnetic radiation, using the transmitters, a first of the transmitters transmitting the electromagnetic radiation including at least a first frequency, a second of the transmitters transmitting the electromagnetic radiation including at least a second frequency different from the first frequency, and a third of the transmitters transmitting the electromagnetic radiation including at least a third frequency different from the first frequency, receiving signals corresponding to the electromagnetic radiation, at all three of the receivers, at a plurality of times, each of the signals including components of at least one of the three frequencies, for each of the receivers, forming a first function of the components including the components of the signal received by the each receiver from the first transmitter at the first frequency, a function of the components including the components of the signal received by the each receiver from the second transmitter at the second frequency, and a function of the components including the components of the signal received by the each transmitter from the third transmitter at the third frequency, the functions being independent of a time delay between the transmitters and the receivers and inferring the position and the orientation of the object from the functions.

14 Claims, 6 Drawing Sheets

WIRELESS SIX-DEGREE-OF-FREEDOM LOCATOR

FIELD AND BACKGROUND OF THE INVENTION

The present invention relates to a method for monitoring the position and orientation of a moving object, of the type in which the moving object transmits electromagnetic signals, representative of the position and orientation thereof, to a fixed receiver. More particularly, the present invention relates to an open loop method in which either the transmitter or the receiver may be spatially extended and in which both the position and the orientation of the moving object are computed noniteratively.

It is known to track the position and orientation of a moving object with respect to a fixed frame of reference, by equipping the moving object with a transmitting apparatus that transmits electromagnetic radiation, placing a receiving apparatus in a known and fixed position in the fixed frame of reference, and inferring the continuously changing position and orientation of the object from signals transmitted by the transmitting apparatus and received by the receiving apparatus. Typically, the transmitting apparatus includes three orthogonal magnetic dipole transmitters; the receiving apparatus includes three orthogonal magnetic dipole receivers; and the object is close enough to the receiving apparatus, and the frequencies of the signals are sufficiently low, that the signals are near field signals. Also typically, the system used is a closed loop system: the receiving apparatus is hardwired to, and explicitly synchronized with, the transmitting apparatus. Representative prior art patents in this field include U.S. Pat. No. 4,287,809 and U.S. Pat. No. 4,394,831, to Egli et al.; U.S. Pat. No. 4,737,794, to Jones; U.S. Pat. No. 4,742,356, to Kuipers; U.S. Pat. No. 4,849,692, to Blood; and U.S. Pat. No. 5,347,289, to Elhardt. Several of the prior art patents, notably Jones, present non-iterative algorithms for computing the position and orientation of magnetic dipole transmitters with respect to magnetic dipole receivers.

Of particular note are U.S. Pat. No. 4,054,881, to Raab, and U.S. Pat. No. 5,600,330, to Blood. Raab purports to teach an open loop system. Raab's system is "open loop" only in the sense that there is no communication from the receiving apparatus to the transmitting apparatus; but it still is necessary to synchronize the transmitting apparatus and the receiving apparatus explicitly. Raab provides several methods for synchronizing the receiving apparatus with the transmitting apparatus, for example a phase locked loop in the case of frequency domain multiplexing, and code timing signals, in the case of spread spectrum multiplexing. In all cases, however, Raab's system requires that the receiver generate a reference signal that is mixed with the received signal, both for the purpose of synchronization and for the purpose of resolving sign ambiguities in all three independent coordinates of the space in which the object moves. In Blood's system, the transmitters are fixed in the fixed reference frame, and the receivers are attached to the moving object; but by reciprocity, this is equivalent to the situation in which the receivers are fixed and the transmitters move. Blood's transmitters are spatially extended, and so cannot be treated as point sources. Blood also presents an algorithm which allows the orientation, but not the position, of the receivers relative to the transmitters to be calculated non-iteratively.

It thus is apparent that there is further room for simplification of the art of tracking a moving object using near field electromagnetic signals. The explicit synchronization required by Raab demands additional hardware and/or signal processing that would not be necessary if explicit synchronization were not required. Blood's iterative calculation of position adds complexity and processing time, to systems with spatially extended transmitters or receivers, that are absent from systems with point sources and point receivers. It would be highly advantageous to have a noniterative method of inferring both the position and the orientation of a transmitting apparatus relative to a spatially extended receiving antenna without explicit synchronization of the transmitters and the receivers.

SUMMARY OF THE INVENTION

According to the present invention there is provided a method for determining the position and orientation of an object with respect to a reference frame, including the steps of: (a) providing the object with three independent transmitters of electromagnetic radiation; (b) providing three independent receivers of the electromagnetic radiation, each of the receivers having a fixed position in the reference frame; (c) transmitting the electromagnetic radiation, using the transmitters, a first of the transmitters transmitting the electromagnetic radiation including at least a first frequency, a second of the transmitters transmitting the electromagnetic radiation including at least a second frequency different from the first frequency, and a third of the transmitters transmitting the electromagnetic radiation including at least a third frequency different from the first frequency; (d) receiving signals corresponding to the electromagnetic radiation, at all three of the receivers, at a plurality of times, each of the signals including components of at least one of the three frequencies; (e) for each of the receivers, forming a first function of the components including the components of the signal received by the each receiver from the first transmitter at the first frequency, a function of the components including the components of the signal received by the each receiver from the second transmitter at the second frequency, and a function of the components including the components of the signal received by the each transmitter from the third transmitter at the third frequency, the functions being independent of a time delay between the transmitters and the receivers; and (f) inferring the position and the orientation of the object from the functions.

According to the present invention there is provided a method for determining the position and orientation of an object with respect to a reference frame, including the steps of: (a) providing the object with three independent transmitters of electromagnetic radiation; (b) providing three independent receivers of the electromagnetic radiation, each of the receivers having a fixed position in the reference frame, at least one of the receivers being spatially extended; (c) transmitting the electromagnetic radiation, using the transmitters, a first of the transmitters transmitting the electromagnetic radiation including at least a first frequency, a second of the transmitters transmitting the electromagnetic radiation including at least a second frequency different from the first frequency, and a third of the transmitters transmitting the electromagnetic radiation including at least a third frequency different from the first frequency; (d) receiving signals corresponding to the electromagnetic radiation, at all three of the receivers, at a plurality of times; and (e) inferring the position and the orientation of the object noniteratively from the signals.

Figure 1:
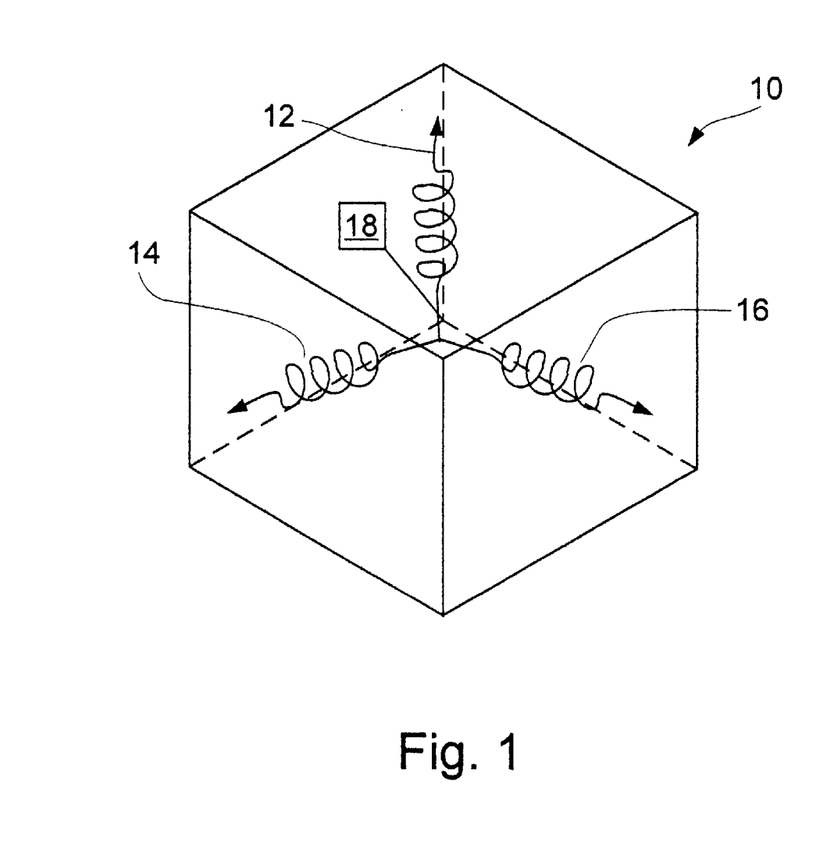
FIG. 1 is a schematic overall depiction, partly in perspective, of the hardware of the present invention.

FIG. 1 shows schematically the hardware of the present invention. A moving object 10 is provided with three independent magnetic dipole transmitter coils 12, 14 and 16 that are powered by transmission circuitry 18. Fixed within the reference frame with respect to which object 10 moves are three independent, spatially extended receiver antennas 20, 22 and 24, electrically coupled to reception circuitry 26. As defined herein, "independent" means that the time varying magnetic fields created by one of coils 12, 14 or 16 cannot be expressed as a linear combination of the time varying magnetic fields created by the other two coils, and that the time varying signals received by one of antennas 20, 22 or 24 cannot be expressed as a linear combination of the signals received by the other two antennas. Preferably, coils 12, 14 and 16 are mutually orthogonal, as shown in FIG. 1. In the most preferred embodiments of the present invention, antennas 20, 22 and 24 are coplanar, as shown in FIG. 1.

Although only one tracked object 10 is illustrated in FIG. 1, it will be readily appreciated from the description below that the present invention is easily adapted to the simultaneous tracking of several objects 10.

Transmission circuitry 18 and reception circuitry 26 need not be explicitly synchronized, as long as the clocks of transmission circuitry 18 and reception circuitry 26 do not drift with respect to each other during one measurement of the position and orientation of object 10 with respect to antennas 20, 22 and 24. This requirement is easily achieved using clocks based on modern crystal oscillators. Two algorithms are presented below whereby signals received by antennas 20, 22 and 24 at a plurality of reception times are transformed into a 3×3 matrix M that is independent of any unknown time shift Δ between the clock of transmission circuitry 18 and reception circuitry 26. One of these algorithms requires synchronization of transmission circuitry 18 and reception circuitry 26 at the beginning of a sampling cycle in order to resolve a phase ambiguity in the matrix M; the other algorithm needs no such synchronization, and resolves the phase ambiguity using the phases of the received signals. A third algorithm is presented below whereby a rotationally invariant 3×3 position matrix W and a 3×3 rotation matrix T are inferred noniteratively from the matrix M. The Euler angles that represent the orientation of object 10 relative to the fixed frame of reference are calculated noniterativly from the elements of T, and the Cartesian coordinates of object 10 relative to the fixed frame of reference are calculated from the elements of W. A preliminary calibration of the system, either by explicitly measuring the signals received by antennas 20, 22 and 24 at a succession of positions and orientations of object 10, or by theoretically predicting these signals at the successive positions and orientations of object 10, is used to determine polynomial coefficients that are used in the noniterative calculation of the Euler angles and the Cartesian coordinates.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method for determining the position and orientation of a target with respect to a reference coordinate frame, by transmitting electromagnetic signals from the target to a receiver that is fixed in the reference coordinate frame, with simpler synchronization of the transmitter and the receiver than in the prior art, or even without explicit synchronization of the transmitter and the receiver, in a system in which the transmitter and receiver are not hardwired. The scope of the present invention also includes a noniterative determination of both position and orientation with respect to spatially extended receiver antennas.

The principles and operation of target tracking according to the present invention may be better understood with reference to the drawings and the accompanying description.

Most generally, the signals transmitted by coils 12, 14 and 16 must be temporally independent, in the sense that the signal supplied to any one of coils 12, 14 and 16 by circuitry 18 is not a linear combination of the signals supplied to the other two coils by circuitry 18. This is achieved most simply and most preferably by transmitting from each coil at a different frequency. For definiteness, the angular frequency of the transmissions from coil 12 is designated herein as $\omega_1$, the angular frequency of the transmissions from coil 14 is designated herein as $\omega_2$, and the angular frequency of the transmissions from coil 16 is designated herein as $\omega_3$.

The transmitted signals induce received signals in antennas 20, 22 and 24. Reception circuitry 26 is operative to digitize the received signals at a sequence of times $t_m$ which are preferably but not necessarily equally spaced. It should be noted that this spacing need not be synchronous with the transmission frequencies. Conceptually, reception circuitry 26 consists of three receivers, each coupled to a different antenna, and computational means for inferring the position and orientation of target 10 from the signals received by the three receivers. The received signals may be organized in a matrix s of three rows, one row for each receiver, and as many columns as there are times $t_m$, one column for each time. Each element of s can be written as:

$$s_{im} = c_{i1}\cos\omega_1 t_m + c_{i2}\sin\omega_1 t_m + c_{i3}\cos\omega_2 t_m + c_{i4}\sin\omega_2 t_m + c_{i5}\cos\omega_3 t_m + c_{i6}\sin\omega_3 t_m \quad (1)$$

$c_{i1}$, $c_{i3}$ and $c_{i5}$ are the in-phase components of the signals received by receiver i from coils 12, 14 and 16, respectively. $c_{i2}$, $c_{i4}$ and $c_{i6}$ are the quadrature components of the signals received by receiver i from coils 12, 14 and 16, respectively. Note that components $c_{i1}$ and $c_{i2}$ refer to frequency $\omega_3$, components $c_{i3}$ and $c_{i4}$ refer to frequency $\omega_2$, and components $c_{i5}$ and $c_{i6}$ refer to frequency $\omega_3$. The components $c_{ij}$ can themselves be arranged in a matrix c of three rows and six columns. The matrices s and c are related by a matrix A of six rows and as many columns as there are in matrix S:

$$s = cA \quad (2)$$

Because the transmission frequencies and the reception times are known, matrix A is known. Equation (2) is solved by right-multiplying both sides by a right inverse of matrix A: a matrix, denoted as $A^{-1}$, such that $AA^{-1}=I$, where I is the 6×6 identity matrix. Right inverse matrix $A^{-1}$ is not unique. A particular right inverse matrix $A^{-1}$ may be selected by criteria that are well known in the art. For example, $A^{-1}$ may be the right inverse of A of smallest $L^2$ norm. Alternatively, matrix c is determined as the generalized inverse of equation (2):

$$c = sA^T(AA^T)^{-1} \quad (3)$$

where the superscript "T" means "transpose". The generalized inverse has the advantage of being an implicit least squares solution of equation (2).

Whether the right inverse $A^{-1}$ or the generalized inverse $A^T(AA^T)^{-1}$ is used to solve equation (2), the right-multiplication of matrix s constitutes a digital filtering operation that returns the amplitudes and phases of the received frequency components in the form of the elements of matrix c. In general, the elements of matrix c must be corrected for amplitude and phase distortions introduced, for example, by reception circuitry 26. This can be done easily given the transfer functions of reception circuitry 26. In the following discussion, it is assumed that such corrections have been made.

The present invention includes two preferred algorithms for forming the matrix M from the matrix c. In the first algorithm, each column of M is formed from components corresponding to the same frequency. Let receiver i' be the receiver with the largest signal magnitude at frequency $\omega_j$. In other words, at one particular value of j, $$(c^2_{i,2j-1} + c^2_{i,2j})^{1/2} \quad (4)$$

is largest for i=i'. Then $$M_{i'j} = (c^2_{i',2j-1} + c^2_{i',2j})^{1/2} \quad (5)$$

and the other two elements (i≠i') of the j-th column of M are $$M_{ij} = (c_{i,2j-1} c_{i',2j-1} + c_{i,2j} c_{i',2j})/M_{i'j} \quad (6)$$

The reference to the receiver with the largest signal magnitude tends to suppress noise. The fact that the two matrix elements of the j-th column of M for i≠i' are projections of their signals onto the signal of largest magnitude tends to suppress eddy current noise, which tends to be 90° out of phase with the signal.

In the second algorithm, frequencies $\omega_2$ and $\omega_3$ are chosen to be even multiples of frequency $\omega_1$, and all matrix elements are referred to the strongest signal at frequency $\omega_1$. The first column of M is as in the first algorithm. Let $\omega_2 = \xi\omega_1$ and $\omega_3 = \zeta\omega_1$, where $\xi$ and $\zeta$ are even integers. Note that the matrix $$R = \begin{pmatrix} c_{i',1} & c_{i',2} \\ -c_{i',2} & c_{i',1} \end{pmatrix} \Big/ (c^2_{i',1} + c^2_{i',2})^{1/2} \quad (7)$$

is a rotation matrix. The elements of the second column of M are the first elements of the column matrices obtained by the operation $$R^\xi \begin{pmatrix} c_{i3} \\ c_{i4} \end{pmatrix} \quad (8)$$

for i=1,2,3. The elements of the third column of M are the first elements of the column matrices obtained by the operation $$R^\zeta \begin{pmatrix} c_{i5} \\ c_{i6} \end{pmatrix} \quad (9)$$

for I=1,2,3.

It is straightforward to show that as long as the transmitter clock and the receiver clock do not drift relative to each other, these expressions for the elements of matrix M are independent of any time shift $\Delta$ between the transmitters and the receivers: substituting $t_m+\Delta$ for $t_m$ in equation (1) does not change the value of the matrix elements of M. If not for the sign ambiguity of the square roots, there would be no need to synchronize the receivers with the transmitters. In fact, under the first algorithm for forming M, it is necessary to synchronize the receivers with the transmitters, as described below, to resolve the sign ambiguity of each $M_{i'j}$. Under the second algorithm for forming M, the remaining ambiguity is resolved as described below.

Note that under the second algorithm, there is only one sign ambiguity. This can be explained as follows: Assign the signal of frequency $\omega_1$ an arbitrary phase $\phi$. Then, if all three transmissions are synchronized, under the near field approximation, the phase of the signal of frequency $\omega_2 = \xi\omega_1$ is $\xi\phi$ and the phase of the signal of frequency $\omega_3 = \zeta\omega_1$ is $\zeta\phi$. The sign ambiguity of $(c^2_{i',1} + c^2_{i',2})^{1/2}$ is equivalent to an ambiguity of $\pi$ radians in $\phi$. But then the phase of the signal of frequency $\omega_2$ is unambiguously $\xi\phi + \xi\pi = \xi\phi$ modulo $2\pi$ and the phase of the signal of frequency $\omega_3$ is unambiguously $\zeta\phi + \zeta\pi = \zeta\phi$ modulo $2\pi$, because $\xi$ and $\eta$ are even integers.

Alternatively, frequencies $\omega_2$ and $\omega_3$ may be the same even multiple $\xi$ of $\omega_1$. Coil 12 transmits a signal proportional to sin $\omega_1 t$. Coil 14 transmits a signal proportional to sin $\xi\omega_1 t$. Coil 16 transmits a signal proportional to cos $\xi\omega_1 t$. Matrix A has only four rows, two for frequency $\omega_1$ and two for frequency $\xi\omega_1$. The second column of M is formed as above. The elements of the third column of M are the second elements of the column matrices obtained by the operation $$R^\xi \begin{pmatrix} c_{i3} \\ c_{i4} \end{pmatrix},$$

for i=1,2,3.

Let T be the orthonormal matrix that defines the rotation of object 10 relative to the reference frame of antennas 20, 22 and 24. Write M in the following form:

$$M = ET_0 T \quad (10)$$

where $T_0$ is an orthogonal matrix and E is in general a nonorthogonal matrix. In general, $T_0$ and E are functions of the position of object 10 relative to the reference frame of antennas 20, 22 and 24. Let $$W^2 = MM^T = ET_0 TT^T T_0^T E^T = EE^T \quad (11)$$

$W^2$ is real and symmetric, and so can be written as $W^2 = Pd^2P^T = (PdP^T)^2$, where $d^2$ is a diagonal matrix whose diagonal elements are the (real and positive) eigenvalues of $W^2$ and where P is a matrix whose columns are the corresponding eigenvectors of $W^2$. Then $W = PdP^T = E$ also is symmetric. Substituting in equation (10) gives:

$$M = PdP^T T_0 T \quad (12)$$

so that $$T = T_0^T P d^{-1} P^T M \quad (13)$$

If $T_0$ is known, then T, and hence the orientation of object 10 with respect to the reference frame of antennas 20, 22 and 24, can be computed using equation (13).

The orthogonal rotation matrix T is used to resolve the above-described residual sign ambiguity in the second algorithm for forming M. Specifically, the first column of T should be the cross product of the second and third columns of T. If, after following the above procedure for forming T, the first column thereof comes out as the negative of the cross product of the second and third columns, then the sign of $(c^2_{i',1}+c^2_{2i',2})^{1/2}$ must be reversed.

For any particular configuration of antennas 20, 22 and 24, $T_0$ may be determined by either of two different calibration procedures.

In the experimental calibration procedure, object 10 is oriented so that T is a unit matrix, object 10 is moved to a succession of positions relative to antennas 20, 22 and 24, and M is measured at each position. The equation $$T_0 = Pd^{-1}P^T M \tag{14}$$

gives $T_0$ at each of those calibration positions.

There are two variants of the theoretical calibration procedure. In the first variant, coils 12, 14 and 16 are modeled as point sources, including as many terms in their multipole expansions as are necessary for accuracy, and their transmitted magnetic fields in the planes of antennas 20, 22 and 24 are calculated at a succession of positions relative thereto, also with object 10 oriented so that T is a unit matrix. The EMF induced in antennas 20, 22 and 24 by these time-varying magnetic fields is calculated using Faraday's law. The transfer function of reception circuitry 26 then is used to compute M at each calibration position, and equation (14) gives $T_0$ at each calibration position. The second variant exploits the principle of reciprocity and treats antennas 20, 22 and 24 as transmitters and coils 12, 14 and 16 as point receivers. The magnetic field generated by each antenna at the three frequencies $\omega_1$, $\omega_2$ and $\omega_3$ is modeled using the Biot-Savart law. Note that each frequency corresponds to a different coil. The signal received at each coil is proportional to the projection of the magnetic field on the axis of the coil when object 10 is oriented so that T is a unit matrix. This gives the corresponding column of M up to a multiplicative constant and up to a correction based on the transfer function of reception circuitry 26.

To interpolate $T_0$ at other positions, a functional expression for $T_0$ is fitted to the measured values of $T_0$. Preferably, this functional expression is a polynomial. In the special case of the "coextensive" preferred embodiment of spatially extended antennas 20, 22 and 24 described below, it has been found most preferable to express the Euler angles $\alpha$, $\beta$ and $\gamma$ that define $T_0$ as the following 36-term polynomials. The arguments of these polynomials are not direct functions of Cartesian coordinates x, y and z, but are combinations of certain elements of matrix $W^2$ that resemble x, y and z, specifically, $a=W^2_{13}/(W^2_{11}+W^2_{33})$, which resembles x; $b=W^2_{23}/(W^2_{22}+W^2_{33})$, which resembles y, and $c=1/W^2_{33}$, which resembles z. Using a direct product notation, the 36-term polynomials can be expressed as:

$$\alpha=(a, a^3, a^5)(b, b^3, b^5)(1, c, c^2, c^3)AZcoe \tag{15}$$

$$\beta=(a, a^3, a^5)(1, b^2, b^4, b^6)(1, c, c^2)ELcoe \tag{16}$$

$$\gamma=(1, a^2, a^4, a^6)(b, b^3, b^5)(1, c, c^2)RLcoe \tag{17}$$

where AZcoe, ELcoe and RLcoe are 36-component vectors of the azimuth coefficients, elevation coefficients and roll coefficients that are fitted to the measured or calculated values of the Euler angles. Note that to fit these 36-component vectors, the calibration procedure must be carried out at at least 36 calibration positions. At each calibration position, $W^2$ is computed from M using equation (11), and the position-like variables a, b and c are computed from $W^2$ as above.

Similarly, the Cartesian coordinates x, y and z of target 10 relative to the reference frame of antennas 20, 22 and 24 may be expressed as polynomials. In the special case of the "coextensive" preferred embodiment of spatially extended antennas 20, 22 and 24 described below, it has been found most preferable to express x, y and z as the following 36-term polynomials:

$$x=(a, a^3, a^5)(1, b, b^4)(1, c, c^2, c^3)Xcoe \tag{18}$$

$$y=(1, a^2, a^4)(b, b^3, b^5)(1, c, c^2, c^3)Ycoe \tag{19}$$

$$z=(1, a^2, a^4)(1, b^2, b^4)(1, d, d^2, d^3)Zcoe \tag{20}$$

where Xcoe, Ycoe and Zcoe are 36-component vectors of the x-coefficients, the y-coefficients, and the z-coefficients, respectively; and $d=\log(c)$. As in the case of the Euler angles, these position coordinate coefficients are determined by either measuring or computing M at at least 36 calibration positions and fitting the resulting values of a, b and c to the known calibration values of x, y and z. Equations (15) through (20) may be used subsequently to infer the Cartesian coordinates and Euler angles of moving and rotating object 10 noniteratively from measured values of M.

Figure 2:
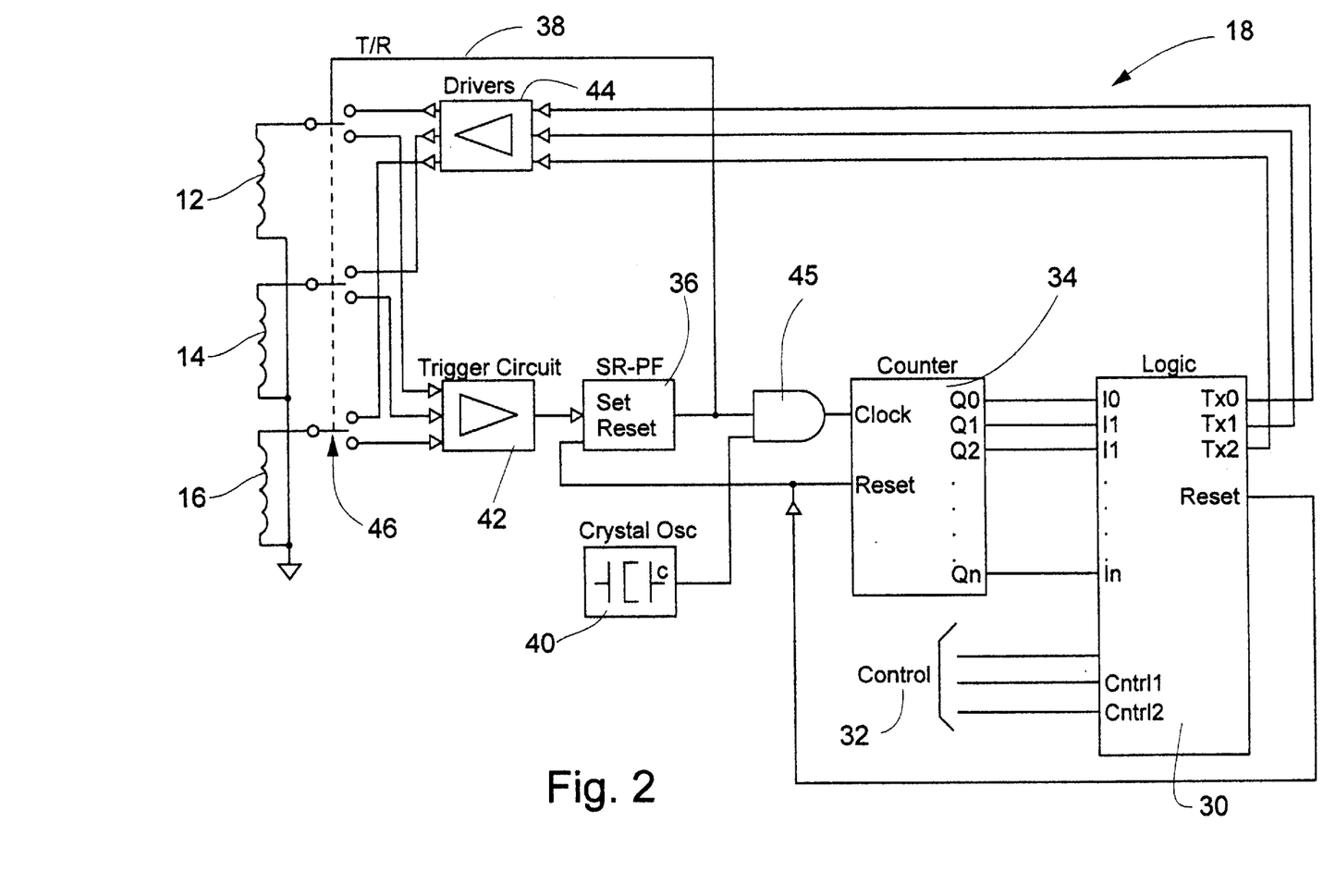
FIG. 2 is a schematic diagram of a preferred embodiment of the transmission circuitry of the present invention.

Referring again to the drawings, FIG. 2 is a schematic diagram of a preferred embodiment of transmission circuitry 18. Transmission circuitry 18 is based on a control unit 30 that receives inputs from one or more external input ports 32 (three are shown) and from a counter 34, and produces four different outputs: transmitted signals TX0, TX1 and TX2 directed to coils 12, 14 and 16, and a reset signal directed to counter 34 and a set reset flip flop (SR-FF) 36. The identity and functionality of the other components of transmission circuitry 18 will be clear from the following description of the operation of transmission circuitry 18.

Transmission circuitry 18 operates in two modes, reception mode and transmission mode. On startup, transmission circuitry 18 is in reception mode: a T/R line 38 from SR-FF 36 sets analog multiplexer switches 46 so that coils 12, 14 and 16 are used as receiving antennas, the outputs of which are fed into the inputs of a trigger circuit 42. Transmission circuitry 18 remains in reception mode until one of coils 12, 14 or 16 receives a trigger signal. The trigger signal may be simply a short pulse which is higher than a pre-set threshold level. This is appropriate to tracking either a single object or multiple objects transmitting at separate sets of frequencies. Alternatively, if multiple objects are tracked, then each object, or each subgroup of objects, may be assigned its own modulation sequence, such as a unique digital code, to serve as a trigger signal. In this way, for example in an application to a three dimensional game, only the game pieces in play are activated. Upon receipt of such a signal, trigger circuit 42 changes the state of SR-FF 36, changing the operational mode of transmission circuitry 18 to transmission mode. In transmission mode, SR-FF 36 sets T/R line 38 so that analog multiplexer switches 46 connect coils 12, 14 and 16 to drivers 44. The output of an oscillator 40 is fed via a gate 45 to counter 34. Counter 34 is a "divide by N" counter with N outputs. Counter 34 counts up from zero, and the N outputs of counter 34 are fed into control unit 30.

The signals generated by control unit 30 at outputs TX0, TX1 and TX2 are periodic signals with three different fundamental frequencies, set via input ports 32. For example, to enable the second algorithm for forming matrix M, a signal with a fundamental frequency of 1000 Hz may be supplied via output TX0, a signal with a fundamental frequency of 2000 Hz may be supplied via output TX1, and a signal with a fundamental frequency of 4000 Hz may be supplied via output TX2. (To enable the alternative version of the second algorithm, in which, for example, the signals supplied via outputs TX1 and TX2 both have the same fundamental frequency, but with a difference in relative phase, the relative phase also is set via input ports 32.) The signals may be pure sinusoids, square waves, or periodic signals of any other convenient waveform. Solving equation (2) for the matrix c is equivalent to performing a Fourier analysis of the received signals, to recover the fundamental sinusoids. After these signals have been generated for a sufficiently long time to allow reception circuitry 26 to compute the position and orientation of target 10, control unit 30 sends a Reset signal to counter 34 and SR-FF 36 to put transmission circuitry 18 back into reception mode.

Most preferably, control unit 30 includes switches that can be operated by a user to change outputs TX0, TX1 and TX2 dynamically. For example, the signal supplied to output TX1 or TX2 can be changed, from a signal whose frequency is one multiple of the frequency of the signal supplied to output TX0, to a signal whose frequency is another multiple of the frequency of the signal supplied to output TX0.

Figure 3:
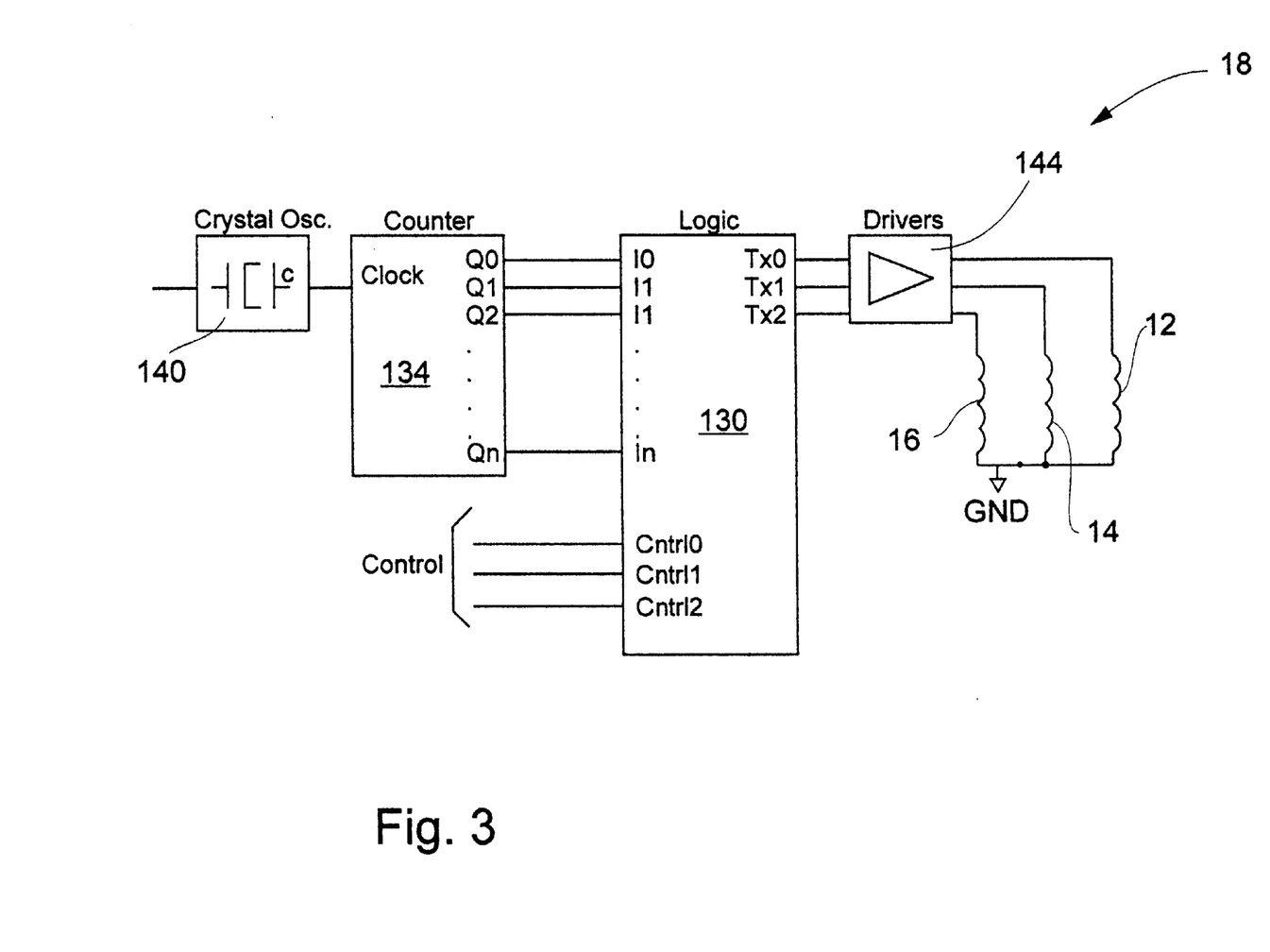
FIG. 3 is a schematic diagram of a simpler preferred embodiment of the transmission circuitry of the present invention.

FIG. 3 is a schematic diagram of a simpler preferred embodiment of transmission circuitry 18, suitable for use with the second algorithm for forming the matrix M. This embodiment operates only in the transmission mode. The output of an oscillator 140 is fed directly to a counter 134. Like counter 34, counter 134 is a "divide by N" counter with N outputs. Counter 134 counts up from zero, and the N outputs are fed into a control unit 130 which produces three transmitted signals TX0, TX1 and TX2 that are directed to coils 12, 14 and 16 via drivers 144.

Figure 4:
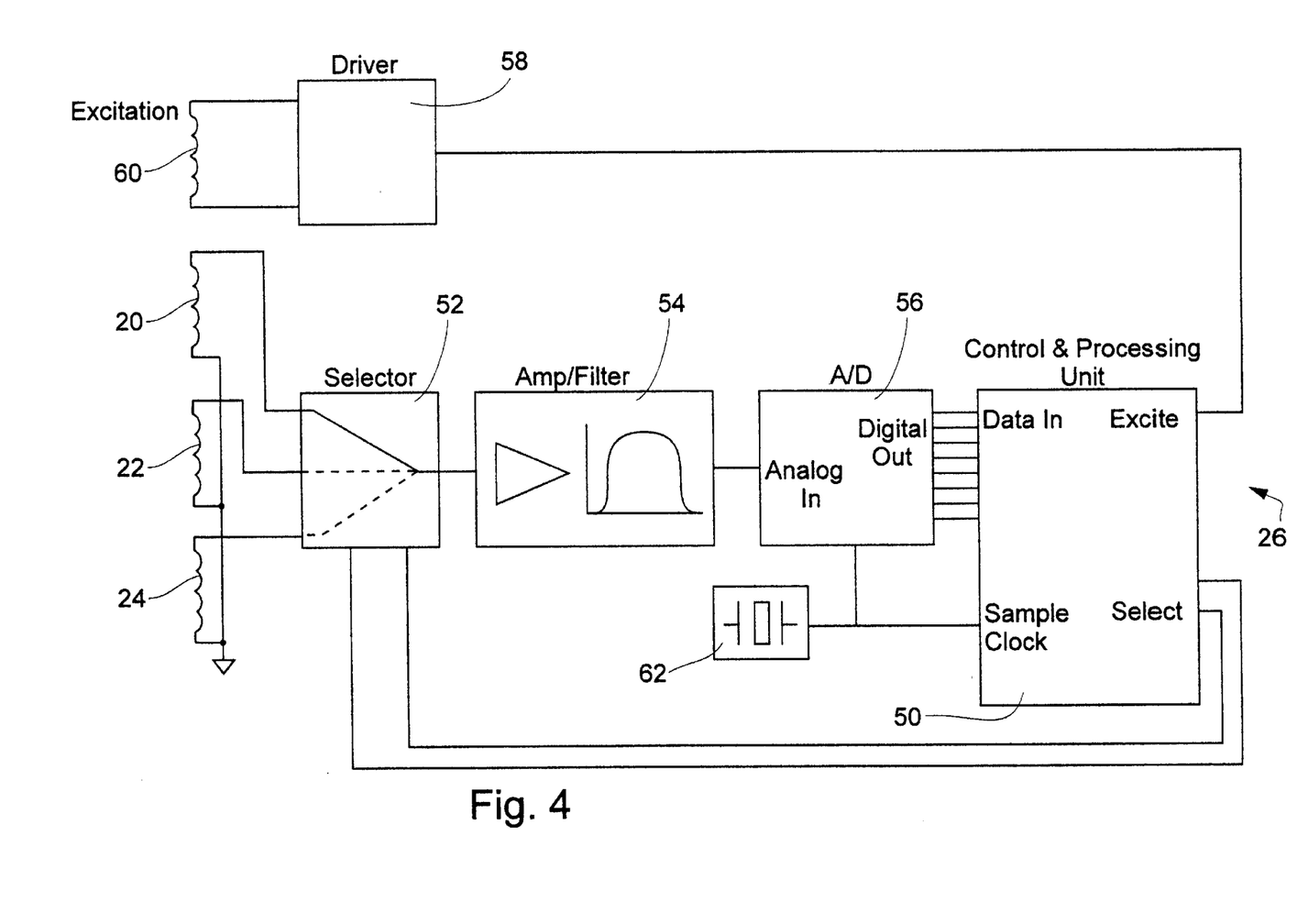
FIG. 4 is a schematic diagram of a preferred embodiment of the reception circuitry of the present invention.

FIG. 4 is a schematic diagram of a preferred embodiment of reception circuitry 26. Antennas 20, 22 and 24 are alternately and successively connected to a control/processing unit 50 via an analog selector switch 52, an amplifier/filter 54 and an A/D converter 56. The timing of control/processing unit 50 and A/D converter 56 is controlled by an oscillator 62. Note that oscillators 40 and 62 need not be synchronized. Most preferably, control/processing unit 50 includes switches similar to the switches of control unit 30 described above. Also connected to, and controlled by, control/processing unit 50 is a driver 58 and an excitation antenna 60.

To start an acquisition cycle, control/processing unit 50 sends an excitation trigger signal to excitation antenna 60 via driver 58. Note that this form of explicit synchronization is considerably simpler than the synchronization of Raab, which requires the mixing of the received signals with a reference signal at the receiver. The trigger signal transmitted by excitation antenna 60 is received by transmission circuitry 18 of FIG. 2 and causes transmission circuitry 18 of FIG. 2 to flip from reception mode to transmission mode. Using analog selector switch 52, control/processing unit 50 selects one antenna 20, 22 or 24 at a time, thereby sampling the signals of all three antennas, at a rate sufficiently high to meet the Nyquist sampling criterion. Control/processing unit 50 computes the position and orientation of target 10, using one of the two algorithms described above.

Figure 5:
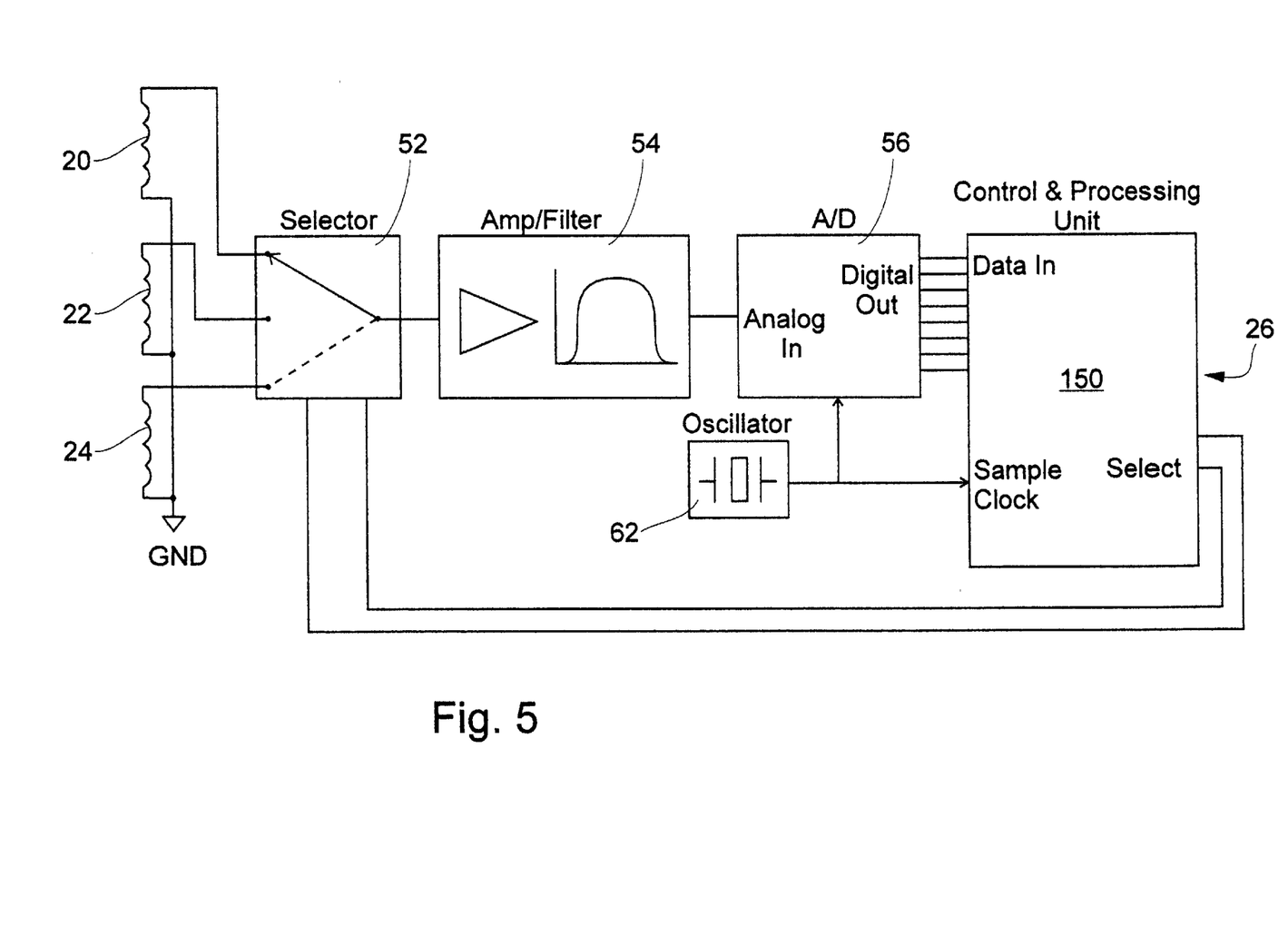
FIG. 5 is a schematic diagram of a simpler preferred embodiment of the reception circuitry of the present invention.

FIG. 5 is a schematic diagram of a simpler preferred embodiment of reception circuitry 26, for use with the embodiment of transmission circuitry 18 illustrated in FIG. 3. This embodiment lacks driver 58 and excitation antenna 60. Correspondingly, control/processing unit 150 which controls this embodiment lacks an "excite" output port. Otherwise, the embodiment of FIG. 5 is identical in construction and operation to the embodiment of FIG. 4.

Figure 6:
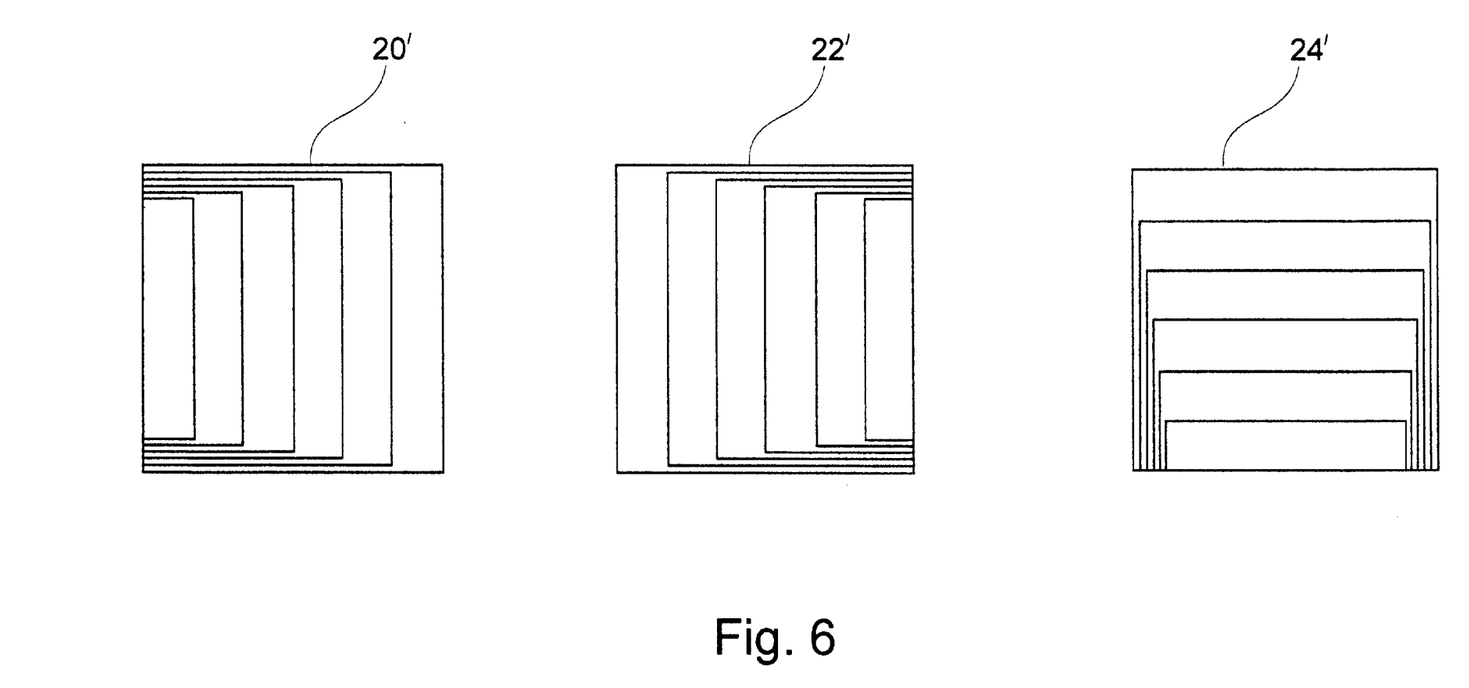
FIG. 6 shows the three component antennas of a set of coextensive linearly independent receiving antennas.

In a most preferred embodiment of the present invention, all three spatially extended antennas 20, 22 and 24 are coextensive, i.e., they occupy substantially the same volume of space, without losing their linear independence, as taught in PCT Publication No. WO 9603188, entitled "Computerized Game Board", which is incorporated by reference for all purposes as if fully set forth herein. Particular reference is made to FIGS. 13A through 14E of that publication, and the accompanying description. FIG. 13A shows two flat rectangular antennas 500 and 550 that, when overlapping, respond differently to transmissions from a game piece (or equivalently from target 10), as illustrated in FIGS. 14A and 14B, despite the occupancy by the two antennas 500 and 550 of substantially the same volume of space. FIG. 6 shows three antennas 20', 22' and 24, in the style of antennas 500 and 550 of WO 9603188, that, when superposed spatially, constitute a set of three coextensive linear independent antennas suitable for use with the present invention.

While the invention has been described with respect to a limited number of embodiments, it will be appreciated that many variations, modifications and other applications of the invention may be made.

What is claimed is:

1. A method for determining the position and orientation of an object with respect to a reference frame, comprising the steps of:
   (a) providing the object with three independent transmitters of electromagnetic radiation;
   (b) providing three independent receivers of said electromagnetic radiation, each of said receivers having a fixed position in the reference frame;
   (c) transmitting said electromagnetic radiation, using said transmitters, a first of said transmitters transmitting said electromagnetic radiation including at least a first frequency, a second of said transmitters transmitting said electromagnetic radiation including at least a second frequency different from said first frequency, and a third of said transmitters transmitting said electromagnetic radiation including at least a third frequency different from said first frequency;
   (d) receiving signals corresponding to said electromagnetic radiation, at all three of said receivers, at a plurality of times, each of said signals including components of at least one of said three frequencies;
   (e) for each of said receivers, forming a first function of said components including said components of said signal received by said each receiver from said first transmitter at said first frequency, a second function of said components including said components of said signal received by said each receiver from said second transmitter at said second frequency, and a third function of said components including said components of said signal received by said each transmitter from said third transmitter at said third frequency, said functions being independent of a time delay between said transmitters and said receivers; and
   (f) inferring the position and the orientation of the object from said functions.

2. The method of claim 1, wherein said third frequency is different from said second frequency.

3. The method of claim 1, wherein, for each of said receivers, said first function includes said components of a strongest of said signals received by any of said receivers at said first frequency, said second function includes components of a strongest of said signals received by any of said receivers at said second frequency, and said third function includes components of a strongest of said signals received by any of said receivers at said second frequency.

4. The method of claim 1, wherein said second frequency and said third frequency are even multiples of said first frequency.

5. The method of claim 4, wherein said second frequency and said third frequency are equal.

6. The method of claim 4, wherein, for each of said receivers, all three of said functions include said components of a strongest of said signals received by any of said receivers at said first frequency.

7. A method for determining the position and orientation of an object with respect to a reference frame, comprising the steps of:
 (a) providing the object with three independent transmitters of electromagnetic radiation;
 (b) providing three independent receivers of said electromagnetic radiation, each of said receivers having a fixed position in the reference frame, at least one of said receivers being spatially extended;
 (c) transmitting said electromagnetic radiation, using said transmitters, a first of said transmitters transmitting said electromagnetic radiation including at least a first frequency, a second of said transmitters transmitting said electromagnetic radiation including at least a second frequency different from said first frequency, and a third of said transmitters transmitting said electromagnetic radiation including at least a third frequency different from said first frequency;
 (d) receiving signals corresponding to said electromagnetic radiation, at all three of said receivers, at a plurality of times; and
 (e) inferring the position and the orientation of the object noniteratively from said signals.

8. The method of claim 7, wherein said third frequency is different from said second frequency.

9. The method of claim 7, wherein each of said signals including components of at least one of said three frequencies, the method further comprising the step of:
 (f) for each of said receivers, forming a first function of said components including said components of said signal received by said each receiver from said first transmitter at said first frequency, a second function of said components including said components of said signal received by said each receiver from said second transmitter at said second frequency, and a third function of said components including said components of said signal received by said each transmitter from said third transmitter at said third frequency, said functions being independent of a time delay between said transmitters and said receivers;
said position and orientation of the object being inferred from said functions.

10. The method of claim 7, further comprising the step of:
 (f) calibrating said inferring of the position and orientation of the object.

11. The method of claim 10, wherein said calibrating includes predicting said signals at a number of calibration positions and a number of calibration orientations.

12. The method of claim 11, wherein said number of calibration positions is at least 36 and said number of calibration orientations are at least 36.

13. The method of claim 10, wherein said calibrating includes measuring said signals at a number of calibration positions and a number of calibration orientations.

14. The method of claim 13, wherein said number of calibration positions is at least 36 and said number of calibration orientations are at least 36.

* * * * *